Sept. 29, 1931.  L. P. MILLER  1,825,240

STEERING DEVICE FOR OUTBOARD MOTOR BOATS

Filed Aug. 19, 1929   2 Sheets-Sheet 1

INVENTOR.
Lloyd P. Miller
BY
ATTORNEYS.

Sept. 29, 1931. L. P. MILLER 1,825,240
STEERING DEVICE FOR OUTBOARD MOTOR BOATS
Filed Aug. 19, 1929 2 Sheets-Sheet 2
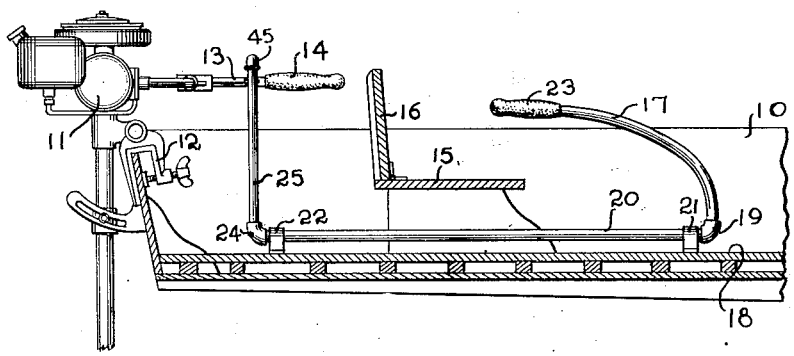
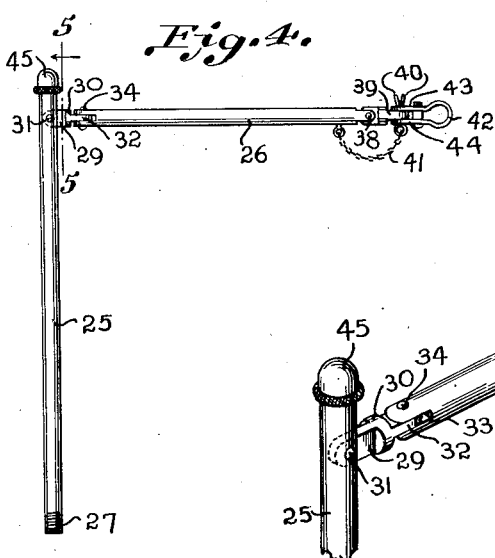
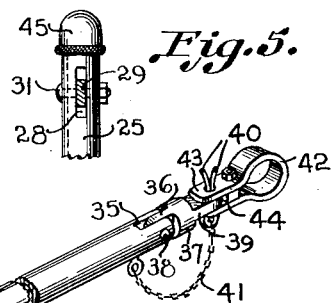
INVENTOR.
Lloyd P. Miller Patented Sept. 29, 1931

1,825,240

UNITED STATES PATENT OFFICE

LLOYD P. MILLER, OF ALLERTON, MASSACHUSETTS

STEERING DEVICE FOR OUTBOARD MOTOR BOATS

Application filed August 19, 1929. Serial No. 386,939.

The present invention relates to improvements in devices for steering outboard motor boats, and has for an object to provide an extension steering mechanism, whereby the operator of the water-craft may occupy a convenient position facing forward in the act of manipulating the steering mechanism.

In accordance with present constructions in which the steering arm comes directly off the motor, the operator is required to sit with his arm in a position behind his body which is awkward and for any length of time becomes tiresome causing discomfort and soreness to the muscles of the arm, neck and back.

The present invention aims to dispense with this difficulty and inconvenience and accomplishes the object by providing a steering mechanism, which connects with the motor steering arm and extends forwardly of the seat of the boat, whereby the operator may face forwardly and guide the water-craft while in a comfortable position and in a position of vantage to observe other water-craft.

A further object of the invention resides in providing an improved extension steering mechanism for outboard motors in which simplicity of construction prevails, and in which the action of the device is direct and positive.

A still further object of the invention lies in providing an improved steering mechanism of the kind above referred to in which the same is constructed with a view to its adaptability to water-craft of existing construction without entailing any modification in the application of the device.

With the foregoing and other objects in view, the invention will be more fully described hereinafter, and will be more particularly pointed out in the claims appended hereto.

In the drawings, wherein like symbols refer to like or corresponding parts throughout the several views, Figure 1 is a fragmentary perspective view of a boat provided with an outboard motor and having the improved steering mechanism.

Figure 3 is a longitudinal section taken through a portion of the boat with an outboard motor and improved steering mechanism shown in side elevation.

Figure 4 is a side elevation showing the upright and cross arm.

Figure 5 is a section taken on the line 5—5 in Figure 4, and

Figure 6 is a fragmentary perspective view showing a portion of the upright and cross arm.

Figure 1:
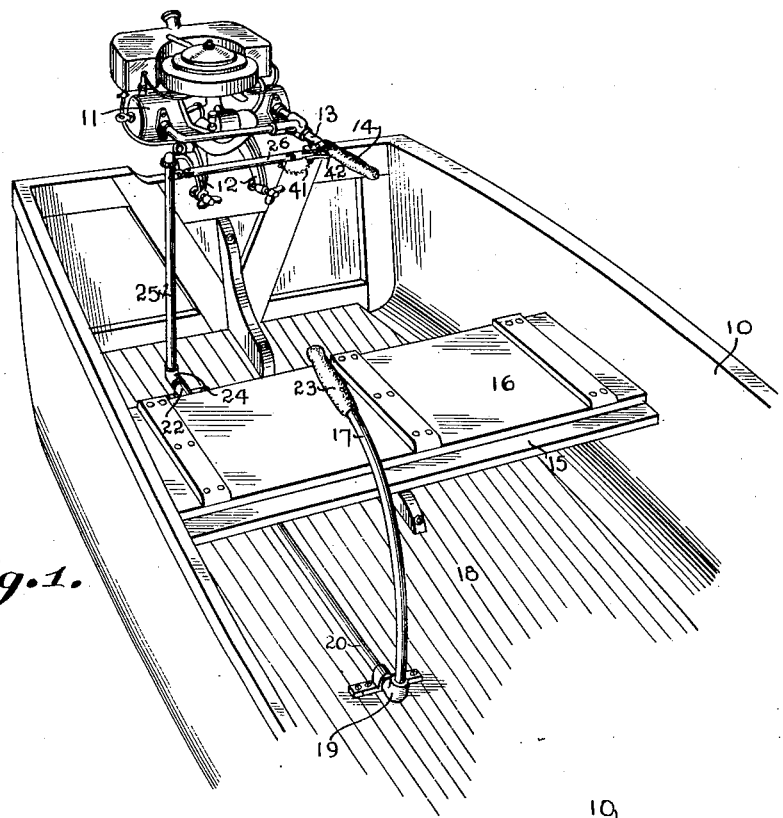

Referring more particularly to the drawings 10 designates generally a boat or any other water-craft, and 11 represents generally an outboard motor attached to the boat by the use of clamps 12 or other appropriate means, and involving in its construction a steering arm 13 having a steering grip 14 thereon. The parts 13 and 14 are usual with conventional outboard motors and they are employed to move the outboard motor to one side or the other in accordance with the direction in which it is desired to steer the craft.

In accordance with the present invention an extension steering meechanism is provided, this extension mechanism being coupled to the arm 13 and extending forwardly of the seat 15.

Figure 2:
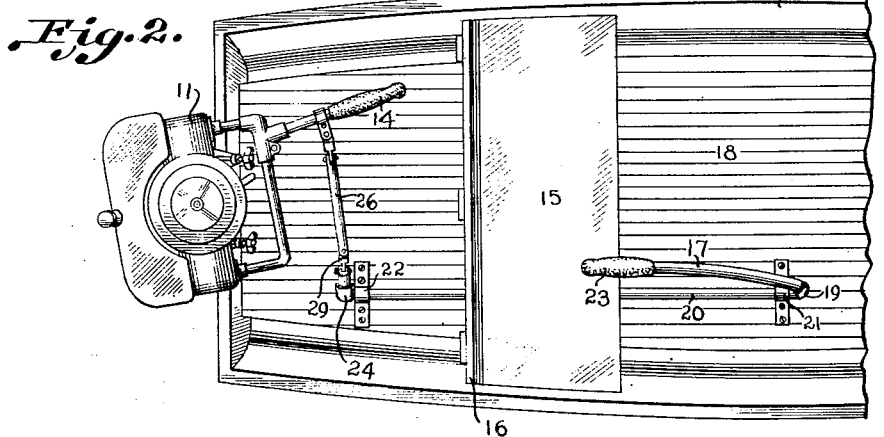
Figure 2 is a top plan view of the same.

The seat 15 may be provided with a hinged back 16, the back being shown in the upright position in Figures 2 and 3 and folded down upon the seat 15 in Figure 1. An operating arm 17 is shown as placed forwardly of the seat 15, the arm being curved upwardly and rearwardly from a position just above the floor or bottom 18 of the boat. The lower end of the arm is removably secured in an elbow 19 to which is also removably secured a rod 20 mounted in the bearings 21 and 22 affixed to the bottom of the boat. The curved operating arm 17 may be provided with a hand grip 23 for the purpose of facilitating the steering operation.

The rear end of the rod 20 is removably secured in an elbow 24 lying behind the rear bearing 22 and having its upper branch disposed to removably receive the upright or standard 25 to the upper end of which the cross arm 26 is secured by a universal joint of any kind or by any other appropriate joint. This cross arm 26 connects with the motor steering arm 13.

As shown more particularly in Figure 4 the lower end of the upright 25 is threaded as indicated at 27 to screw into and out of the upper branch of the rear elbow 24. All of the parts may be made of tubular brass or other appropriate construction which will possess the requisite strength without excess weight.

Referring to Figure 5, the upper portion of the upright 25 is provided with a slot 28 disposed at substantially right angles to the length of the boat and positioned to receive one shank 29 of a universal joint connection 30. The shank 29 is pivoted, as indicated at 31 to the upright 25 within the slot 28, whereby the connection 30 may have a vertically swinging movement. The connection 30 is also provided with a flat shank 32, which is turned at substantially right angles to the flatwise dimension of the companion shank 29. This shank 32 is received within a recess 33 in one end of the cross arm 26 to which it is pivoted as indicated at 34 for horizontal swinging movement. Thus, the cross arm 26 may have a vertical swinging movement about the fulcrum 31 and a horizontal swinging movement about the pivot 34 giving the arm a universal range of movement.

At its opposite end the cross arm 26 is slotted as shown at 35 to receive the shank 36 of the universal joint connection 37. At 38 is indicated the fulcrum for this end of the universal joint, enabling the arm 26 to pivot vertically about said fulcrum 38. The other flat shank 39 of this universal joint is turned as to its flatwise dimension at substantially right angles to the companion shank 36, and such shank 39 is perforated to receive the cotter pin 40 or other appropriate fastening device. The cotter pin is preferably secured by a chain 41 to the cross arm 26.

A clamp collar 42 is adapted to extend about the motor steering arm 13 adjacent the grip 14 and to be removably received about such arm. The flanges 43 and 44 of the split collar 42 are received upon opposite sides of the shank 39 and are perforated to receive therethrough also the cotter pin 40, whereby the clamp 42 is removably held to the motor steering arm 13.

In the use of the device, an occupant of the boat and of the seat 15 may face forwardly and still be in a position to grasp the grip 23 of the operating arm 17. Moreover, this arm is so curved forwardly and downwardly that it will not interfere with the knees and legs of the operator, but will afford ample room in front of the seat for the convenience of the operator in occupying the seat and in moving into and out of the same. By swinging the operating arm 17 to one side or the other, a rotary movement is imparted to the rod 20 and a swinging movement to the upright 25 similar to that given the operating arm or lever 17. Consequently, the cross arm 26 will be subjected to a push or pull which will be communicated to the steering arm 13 of the motor and cause the outboard motor to be swung about its pivotal connection to effect a steering of the water-craft in accordance with the well known construction.

It is to be noted that the upper end of the upright 25 is capped with an acorn or other fitting 45, and that such fitting extends above the cross arm 26, so that this fitting also provides an operating piece which may be conveniently grasped for steering the boat from a position at the rear thereof but at the opposite side with reference to the motor steering arm 13.

As the cross arm is fitted with two universals all binding will be prevented and a free movement allowed for the motor from left to right. This double universal construction also permits the motor to be tipped up for landing or in the event of same striking an object in the water.

It will be understood that the universal joints 30 and 37 may be of any suitable type, such as ball and socket joints.

It is obvious that various changes and modifications may be made in the details of construction and design of the above specifically described embodiment of this invention without departing from the spirit thereof, such changes and modifications being restricted only by the scope of the following claims:—

What is claimed is:—

1. In combination with a boat, and an outboard motor for the same having steering means, a transversely movable upright mounted in the boat adjacent said steering means, an arm universally connected to said upright and to the motor steering means, and a remote control device for moving said upright laterally.

2. In a boat having a seat, an outboard motor for the boat having a steering means to the rear of said seat, an upright swingingly supported in the rear portion of the boat and in rear of said seat, an arm swivelly connected at its ends to the upright and to the steering means, and a lever forwardly of the seat of the boat and coupled to swing said upright.

3. In a boat having a seat, an outboard motor for the boat having steering means, a cross arm universally and detachably clamped to said steering means, an upright swingably supported in a lateral direction and universally coupled to the cross arm, a rock rod mounted in the bottom of the boat and coupled to said upright, and a curved operating lever coupled to the forward end of the rock end and extending in front of the boat seat.

4. In a boat, including steering means therefor having a rearwardly extending tiller, a cross arm universally and detachably clamped to said tiller, an upright pivotally supported at its lower end by and swingable crosswise the boat, said upright coupled at its upper end portion to said cross arm, a rock rod extending longitudinally of the boat and coupled to said upright, and an operating lever coupled to the forward end of the rock rod and swingable crosswise the boat.

LLOYD P. MILLER.